United States Patent
Ryu et al.

(10) Patent No.: US 9,433,921 B2
(45) Date of Patent: Sep. 6, 2016

(54) METHOD FOR PREPARING A SUPER ABSORBENT POLYMER

(71) Applicant: LG Chem, Ltd., Seoul (KR)

(72) Inventors: Chul Hee Ryu, Daejeon (KR); Gi Cheul Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/911,220

(22) PCT Filed: Jul. 17, 2014

(86) PCT No.: PCT/KR2014/006509
§ 371 (c)(1),
(2) Date: Feb. 9, 2016

(87) PCT Pub. No.: WO2015/030367
PCT Pub. Date: Mar. 5, 2015

(65) Prior Publication Data
US 2016/0175813 A1    Jun. 23, 2016

(30) Foreign Application Priority Data

Aug. 27, 2013  (KR) .................. 10-2013-0101915
Jul. 16, 2014   (KR) .................. 10-2014-0089911

(51) Int. Cl.
| | |
|---|---|
| B01J 20/26 | (2006.01) |
| C08F 2/10 | (2006.01) |
| C08J 3/12 | (2006.01) |
| C08F 6/00 | (2006.01) |
| C08L 101/14 | (2006.01) |
| B01J 20/28 | (2006.01) |

(52) U.S. Cl.
CPC ......... B01J 20/267 (2013.01); B01J 20/28016 (2013.01); C08F 2/10 (2013.01); C08F 6/008 (2013.01); C08J 3/12 (2013.01); C08L 101/14 (2013.01)

(58) Field of Classification Search
CPC ....................................................... B01J 20/26
USPC ....................................................... 502/402
See application file for complete search history.

(56) References Cited

U.S. PATENT DOCUMENTS

| | | |
|---|---|---|
| 4,446,261 A | 5/1984 | Yamasaki et al. |
| 2004/0249120 A1 | 12/2004 | Nagasawa et al. |
| 2008/0161522 A1 | 7/2008 | Riegel et al. |
| 2011/0237739 A1 | 9/2011 | Tada et al. |
| 2013/0005904 A1 | 1/2013 | Kanzaki et al. |
| 2014/0051813 A1 | 2/2014 | Won et al. |

FOREIGN PATENT DOCUMENTS

| | | |
|---|---|---|
| EP | 2404954 A1 | 1/2012 |
| JP | S56-161408 A | 12/1981 |
| JP | S57-158209 A | 9/1982 |
| JP | S57-198714 A | 12/1982 |
| JP | H05-31856 A | 2/1993 |
| JP | H11-172129 A | 6/1999 |
| JP | H11-246625 A | 9/1999 |
| JP | 2005015787 A | 1/2005 |
| JP | 2005054151 A | 3/2005 |
| JP | 2006143836 A | 6/2006 |
| JP | 2008535963 A | 9/2008 |
| JP | 2010538095 A | 12/2010 |
| KR | 20110015074 A | 2/2011 |
| KR | 20120059169 A | 6/2012 |
| KR | 20130001563 A | 1/2013 |
| KR | 20140036866 A | 3/2014 |

OTHER PUBLICATIONS

International Search Report for Application No. PCT/KR2014/006509 dated Nov. 17, 2014.
Odian, George G., Principles of Polymerization, John Wiley & Sons, Inc., Second Edition, 1981, p. 203.
Third Party Observation for Application No. PCT/KR2014/006509 dated Dec. 25, 2015.
Buchholz, F.L. and Graham, A.T., "Modern Superabsorbent Polymer Technology," John Wiley & Sons(1998), p. 161.
Reinhold Schwalm, "UV Coatings: Basics, Recent Developments and New Application (Elsevier 2007)" p. 115.

*Primary Examiner* — Edward Johnson
(74) *Attorney, Agent, or Firm* — Lerner, David, Littenberg, Krumholz & Mentlik, LLP

(57) ABSTRACT

The present invention relates to a method for preparing a super absorbent polymer. The method for preparing a super absorbent polymer according to the present invention comprises the steps of: carrying out a thermal polymerization or a photopolymerization of a monomer composition including a water-soluble ethylene-based unsaturated monomer and a polymerization initiator to form a hydrogel polymer; drying the hydrogel polymer; pulverizing the dried polymer; mixing a fine powder having a particle diameter of 180 μm or less and a polymer having a particle diameter of 300 μm or more among the pulverized polymer; and adding steam to the mixture to carry out a reassembling. According to the present invention, the super absorbent polymer having a high fine powder aggregation strength can be obtained.

9 Claims, No Drawings

METHOD FOR PREPARING A SUPER ABSORBENT POLYMER

CROSS-REFERENCE TO RELATED APPLICATION

This application is a national phase entry under 35 U.S.C. §371 of International Application No. PCT/KR2014/006509, filed Jul. 17, 2014, which claims priority to Korean Patent Application No. 10-2013-0101915, filed Aug. 27, 2013 and Korean Patent Application No. 10-2014-0089911, filed Jul. 16, 2014, the disclosures of which are incorporated herein by reference.

BACKGROUND OF THE INVENTION (a) Field of the Invention

The present invention relates to a method for preparing a super absorbent polymer. More specifically, the present invention relates to a method for preparing a super absorbent polymer having a high fine powder aggregation strength.

(b) Description of the Related Art

Super absorbent polymer (SAP) is a synthetic polymer material having a function capable of absorbing moisture from about 500 to about 1,000 times of its own weight. Each manufacturer has denominated it as different names such as SAM (Super Absorbency Material), AGM (Absorbent Gel Material) or the like. Such super absorbent polymers started to be practically applied in sanitary products, and now they have been widely used not only for hygiene products such as disposable diapers for children, etc., but also for water retaining soil products for gardening, water stop materials for the civil engineering and construction, sheets for raising seedling, fresh-keeping agents for food distribution fields, materials for poultice or the like. As a method for preparing a super absorbent polymer, an inverse suspension polymerization method, an aqueous solution polymerization method or the like are known. For example, the inverse suspension polymerization is disclosed in Japanese Patent Publication Nos. Sho56-161408, Sho57-158209, Sho57-198714, and so on. Furthermore, the aqueous solution polymerization method, such as a thermal polymerization method in which a polymer gel is polymerized while being broken and cooled in a kneader equipped with a plurality of spindles, and a photopolymerization method in which an aqueous solution with a high concentration is irradiated with UV rays or the like onto a belt to carry out the polymerization and drying at the same time are known.

The hydrogel polymer obtained through said polymerization reaction is generally marketed as a powdered product after it is dried and pulverized.

At this time, fine powders (fines) having a particle diameter of about 180 μm or less may be formed during the steps of cutting, pulverizing and powdering the dried polymer. It is considered undesirable to apply the super absorbent polymer particle including the fine powder to hygiene goods such as a baby diapers and an adult urinary incontinence device because it may be moved before being used or may show decreased physical properties.

Therefore, the process for excluding the fine powders so that the fine powder is not included in a final product or the reassembling process for aggregating a fine powder to be normal particle size is needed. In this case, it is important to have a high aggregation strength so that the particles are not crushed again after the reassembling process. The reassembling process is generally carried out under a wet condition for raising the aggregation strength. At this time, the more moisture content of the fine powders, the more aggregation strength but it is not easy to handle the same during the reassembling process, and the less moisture content, the easier reassembling process but the aggregation strength is low and thus the fine powders may be easily crushed again after the reassembling.

SUMMARY OF THE INVENTION

For resolving the aforesaid problems of the prior arts, it is an object of the present invention to provide a method for preparing a super absorbent polymer having a high fine powder aggregation strength.

To achieve the above object, the present invention provides a method for preparing a super absorbent polymer, comprising the steps of: carrying out a thermal polymerization or a photopolymerization of a monomer composition including a water-soluble ethylene-based unsaturated monomer and a polymerization initiator to form a hydrogel polymer; drying the hydrogel polymer; pulverizing the dried polymer; mixing a fine powder having a particle diameter of 180 μm or less and a polymer having a particle diameter of 300 μm or more among the pulverized polymer; and adding steam to the mixture to carry out a reassembling.

According to one embodiment of the present invention, a fine powder having a particle diameter of 180 μm or less can be mixed in an amount of 50 to 98% by weight, and a polymer having a particle diameter of 300 μm or more can be mixed in an amount of 2 to 50% by weight.

According to the preparation method of the the present invention, the super absorbent polymer having a high fine powder aggregation strength can be prepared through easy reassembling step.

DETAILED DESCRIPTION OF THE EMBODIMENTS

The method of preparing a super absorbent polymer according to the present invention comprises the steps of: carrying out a thermal polymerization or a photopolymerization of a monomer composition including a water-soluble ethylene-based unsaturated monomer and a polymerization initiator to form a hydrogel polymer; drying the hydrogel polymer; pulverizing the dried polymer; mixing a fine powder having a particle diameter of 180 μm or less and a polymer having a particle diameter of 300 μm or more among the pulverized polymer; and adding steam to the mixture to carrying out a reassembling.

Hereinafter, the method for preparing a super absorbent polymer according to an embodiment of the present invention will be described in detail.

In the method for preparing a super absorbent polymer according to the present invention, first, a thermal polymerization or a photopolymerization of a monomer composition including a water-soluble ethylene-based unsaturated monomer and a polymerization initiator is carried out to form a hydrogel polymer.

The monomer composition, the raw material of the super absorbent polymer, includes a water-soluble ethylene-based unsaturated monomer and a polymerization initiator.

As the water-soluble ethylene-based unsaturated monomer, any monomer that is generally used in the preparation of the super absorbent polymer may be used without limitation. For example, one or more monomers selected from the group consisting of an anionic monomer and a salt thereof, a nonionic hydrophilic monomer, and an unsaturated monomer containing amino group and a quaternary compound thereof may be used.

Specifically, one or more compounds selected from the group consisting of an anionic monomer such as (meth)acrylic acid, maleic anhydride, fumalic acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and a salt thereof; a nonionic hydrophilic monomer such as (meth)acrylamide, N-substituted(meth)acrylate, 2-hydroxyethyl(meth)acrylate, 2-hydroxypropyl(meth)acrylate, methoxypolyethyleneglycol(meth)acrylate, or polyethyleneglycol(meth)acrylate; and an unsaturated monomer containing amino group such as (N,N)-dimethylaminoethyl (meth)acrylate or (N,N)-dimethylaminopropyl(meth) acrylate, and a quaternary compound thereof may be used.

More preferably, acrylic acid or a salt thereof, for example, acrylic acid or an alkali metal salt thereof such as sodium acrylate, may be used. By using such monomer, it becomes possible to prepare a super absorbent polymer having superior physical properties. In the case where the alkali metal salt of acrylic acid is used as the monomer, it is possible to use acrylic acid after neutralizing the same with a basic compound such as sodium hydroxide (NaOH).

The concentration of the water-soluble ethylene-based unsaturated monomer may be about 20% to about 60% by weight, preferably about 40% to about 50% by weight, based on the monomer composition including the raw materials of the super absorbent polymer and the solvent, and it may be controlled to be an adequate concentration in consideration of the polymerization time and the reaction conditions. However, when the concentration of the monomer is excessively low, the yield of the super absorbent polymer is low and there may be a problem in economic efficiency. In contrast, when the concentration is excessively high, it may cause problems in processes that some of the monomer may be extracted or the pulverization efficiency of the prepared hydrogel polymer appears low in the pulverizing process, and thus the physical properties of the super absorbent polymer may decrease.

In the preparation method of the super absorbent polymer according to the present invention, the polymerization initiator used during the polymerization is not particularly limited as long as it is generally used in the preparation of the super absorbent polymer.

Specifically, the polymerization initiator that can be used herein includes a thermal polymerization initiator or a photopolymerization initiator by UV irradiation, depending on the polymerization method. However, even in the case of using the photopolymerization method, because a certain amount of heat is generated by the ultraviolet irradiation or the like and a certain degree of heat is generated according to the progress of the exothermic polymerization reaction, a thermal polymerization initiator may be additionally included.

The photopolymerization initiator can be used without any limitation as long as it is a compound capable of forming a radical by a light such as an UV ray.

The photopolymerization initiator, for example, may include one or more initiators selected from the group consisting of a benzoin ether, a dialkyl acetophenone, a hydroxyl alkylketone, a phenyl glyoxylate, a benzyl dimethyl ketal, an acyl phosphine, and an α-aminoketone. Meanwhile, specific examples of the acyl phosphine may include normal lucirin TPO, namely, 2,4,6-trimethyl-benzoyl-trimethyl phosphine oxide. More various photopolymerization initiators are well disclosed in "UV Coatings: Basics, Recent Developments and New Application" written by Reinhold Schwalm, (Elsevier, 2007), p115, however the photopolymerization initiator is not limited to the above-described examples.

The photopolymerization initiator may be included in the concentration of about 0.01% to about 1.0% by weight based on the monomer composition. When the concentration of the photopolymerization initiator is excessively low, the polymerization rate may become slow, and when the concentration of the photopolymerization initiator is excessively high, the molecular weight of the super absorbent polymer becomes small and its physical properties may become uneven.

And, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), and the like; and examples of the azo-based initiator may include 2,2-azobis-(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid) and the like. More various thermal polymerization initiators are well disclosed in "Principle of Polymerization" written by Odian, (Wiley, 1981), p203, however the thermal polymerization initiator is not limited to the above-described examples.

The thermal polymerization initiator can be included in the concentration of about 0.001% to about 0.5% by weight based on the monomer composition. When the concentration of the thermal polymerization initiator is excessively low, the additional thermal polymerization hardly occurs and thus effects due to the addition of the thermal polymerization initiator may be insignificant, and when the concentration of the thermal polymerization initiator is excessively high, the molecular weight of the super absorbent polymer becomes small and the physical properties may become uneven.

According to one embodiment of the present invention, the monomer composition may further include an internal crosslinking agent as the raw material of the super absorbent polymer. The internal crosslinking agent may include a crosslinking agent having one or more ethylene-based unsaturated functional groups in addition to one or more functional groups capable of reacting with the water-soluble substituents of the water-soluble ethylene-based unsaturated monomer; or a crosslinking agent having two or more functional groups capable of reacting with the water-soluble substituents of the monomer and/or the water-soluble substituents formed by hydrolysis of the monomer.

Specific examples of the internal crosslinking agent may include a $C_8$-$C_{12}$ bisacrylamide, bismethacrylamide, a poly (meth)acrylate of $C_2$-$C_{10}$ polyol, or a poly(meth)allylether of $C_2$-$C_{10}$ polyol, and so on may be used, and more specifically, one or more agents selected from the group consisting of N,N'-methylenebis(meth)acrylate, ethyleneoxy(meth)acrylate, polyethyleneoxy(meth)acrylate, propyleneoxy(meth)acrylate, glycerin diacrylate, glycerin triacrylate, trimethylol triacrylate, triallylamine, triarylcyanurate, triallylisocyanate, polyethyleneglycol, diethyleneglycol, and propyleneglycol may be used.

Such internal crosslinking agent may be included in the concentration of about 0.01% to about 0.5% by weight based on the monomer composition and can cross-link the polymerized polymer.

In the preparation method of the present invention, the monomer composition of the super absorbent polymer may further include additives such as a thickener, a plasticizer, a preservation stabilizer, an antioxidant, and so on, as needed.

The raw materials such as the water-soluble ethylene-based unsaturated monomer, the photopolymerization initiator, the thermal polymerization initiator, the internal crosslinking agent, and the additives may be prepared in the form of the monomer composition solution which is dissolved in a solvent.

In this case, the solvent can be used without any limitation as long as it can dissolve the above-described components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and so on may be used alone or in combination with each other.

The solvent may be included in a residual amount of excluding the above-described components from the total weight of the monomer composition.

Meanwhile, the method for preparing a hydrogel polymer by the thermal polymerization or photopolymerization of the monomer composition is not particularly limited as long as it is a method typically used in the art.

Specifically, the polymerization method is largely classified into a thermal polymerization and a photopolymerization depending on the polymerization energy source. The thermal polymerization may be typically carried out in a reactor like a kneader equipped with agitating spindles, and the photopolymerization may be carried out in a reactor equipped with a movable conveyor belt. However the above-described polymerization method is an example only, and the present invention is not limited thereto.

For example, as described above, the thermal polymerization is carried out by supplying hot air to a reactor like a kneader equipped with the agitating spindles or by heating the reactor, thereby obtaining a hydrogel polymer. At this time, the hydrogel polymer may have a size of centimeters or millimeters when it is discharged from the outlet of the reactor, depending on the type of the agitating spindles equipped in the reactor. Specifically, the size of the hydrogel polymer may vary depending on the concentration of the monomer composition injected thereto, the injection rate or the like, and the hydrogel polymer having a weight average particle diameter of 2 mm to 50 mm can be generally obtained.

Furthermore, when the photopolymerization is carried out in a reactor equipped with a movable conveyor belt, the form of the hydrogel polymer obtained may be usually a sheet-like hydrogel polymer having a width of the belt. In this case, the thickness of the polymer sheet may vary depending on the concentration of the monomer composition injected thereto and the injection rate. However, typically it is preferable to supply the monomer composition so that the sheet-like polymer having a thickness of about 0.5 cm to about 5 cm can be obtained. When the monomer composition is supplied so that the thickness of the sheet-like polymer becomes too thin, it is not preferred because the production efficiency is low. When the thickness of the sheet-like polymer exceeds 5 cm, the polymerization reaction may not uniformly occur throughout the whole thickness due to its excessively thick thickness.

The hydrogel polymer obtained by such method may have typically a moisture content of about 40% to about 80% by weight. Meanwhile, the term "moisture content" as used herein refers to the content of moisture in the total weight of the hydrogel polymer, which is obtained by subtracting the weight of the dried polymer from the weight of the hydrogel polymer. Specifically, it is defined as a value calculated by measuring the weight loss according to evaporation of water in the polymer during the drying process by increasing the temperature of the polymer through infrared heating. In this case, the moisture content is measured under the drying conditions where the temperature is increased from room temperature to 180° C. and then the temperature is maintained at 180° C., and the total drying time is set to 20 minutes, including 5 minutes for the temperature rising step.

Subsequently, a step of drying the hydrogel polymer thus obtained is carried out.

In this case, in order to increase the efficiency of the drying step, a coarsely pulverizing step may be further carried out before drying, as needed.

A pulverizing machine used herein may include, but its configuration is not limited to, for example, any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

The pulverizing step may be carried out so that the particle diameter of the hydrogel polymer becomes about 2 mm to about 10 mm.

Pulverizing the hydrogel polymer into a particle diameter of less than 2 mm is technically not easy due to its high moisture content, and agglomeration may occur between the pulverized particles. Meanwhile, if the polymer is pulverized into a particle diameter of greater than 10 mm, the effect of increasing the efficiency in the subsequent drying step may be insignificant.

The hydrogel polymer pulverized as above or the hydrogel polymer immediately after polymerization without the pulverizing step is subjected to a drying step. In this case, the drying temperature of the drying step may be about 150 to about 250° C. When the drying temperature is less than 150° C., it is likely that the drying time becomes too long or the physical properties of the super absorbent polymer finally formed is deteriorated, and when the drying temperature is higher than 250° C., only the surface of the polymer is dried, and thus it is likely that fine powder is generated during the subsequent pulverizing step and the physical properties of the super absorbent polymer finally formed is deteriorated. Therefore, the drying step may be preferably carried out at a temperature of about 150° C. to about 200° C., and more preferably at a temperature of about 160° C. to about 180° C.

Meanwhile, the drying time may be about 20 to about 90 minutes, in consideration of the process efficiency, but it is not limited thereto.

In the drying step, the drying method may also be selected and used without any limitation if it is a method generally used for drying the hydrogel polymer. Specifically, the drying step may be carried out by a method such as hot air supply, infrared irradiation, microwave irradiation or ultraviolet irradiation. When the drying step as above is finished, the moisture content of the polymer may be about 0.1% to about 10% by weight.

Subsequently, the dried polymer obtained through the drying step is subjected to a pulverization step.

The polymer powder obtained through the pulverizing step may have a particle diameter of about 150 μm to about 850 μm. Specific examples of a pulverizing device that can be used to achieve the above particle diameter may include a pin mill, a hammer mill, a screw mill, a roll mill, a disc mill, a jog mill or the like, but the present invention is not limited thereto.

Also, in order to control the physical properties of the super absorbent polymer powder finally commercialized after the pulverization step, a separate step of classifying the polymer powder obtained after the pulverization depending on the particle diameter may be undergone. Preferably, a polymer having a particle diameter of about 180 μm to about 850 μm is classified.

In the disclosure of the present invention, a fine particle having a constant particle size or less, that is, a particle size of about 180 μm or less, is referred to as super absorbent polymer fine powders, SAP fines or fine powders. The fine particle may be generated during the polymerization step, the drying step or the pulverizing step of the dried polymer. However, when the fine powder is included in a product, s handling is difficult and it may show a phenomenon of gel blocking and deteriorate the physical properties. Therefore, it is preferable to exclude the fine powder or reuse the fine powder to be a normal particle so that it is not included in a final resin product.

As one example, the reassembling step carried out for aggregating the fine powders to be a normal particle size. The reassembling step is generally carried out at a wet condition of about 30% to about 60% in order to increase the aggregation strength of the fine powders. In this case, the higher moisture content of the fine powders, the higher aggregation strength of the fine powders. However, during the reassembling step, an excessively large lump of the reassembled body may occur and it may cause a problem in an operation process. Further, the less moisture content, the easier reassembling step but the aggregation strength is low and thus it may be easily crushed again into fine powder after the reassembling step.

According to the preparation method of the present invention, the reassembling step is carried out by mixing a fine powder having a particle diameter of 180 μm or less and a polymer having a particle diameter of 300 μm or more among the pulverized polymer and adding steam to the mixture, rather than by reassembling only fine particles.

The method of adding steam is not particularly limited. According to one embodiment of the present invention, the steam can be added in the form of spray so that the steam can be uniformly dispersed in the mixture of the fine powder and the polymer.

The temperature of the steam may be about 100° C. to about 200° C., preferably about 100° C. to about 160° C. Also, the rate of spraying the steam may be about 40 to about 250 kg/hr, preferably about 65 to about 150 kg/hr. When the temperature and rate of spraying the steam are within the above range, the reassembling step is easy and an assembly having a large aggregation strength of fine particles can be formed.

Further, according to one embodiment of the present invention, the steam can be added in an amount of about 30 to about 300 parts by weight, preferably about 40 to about 250 parts by weight, based on 100 parts by weight of the entire mixture to which a fine powder having a particle diameter of 180 μm or less and a polymer having a particle diameter of 300 μm or more are added. When the addition amount of the steam is within the above range, the reassembling step is easily carried out without significant load, and a reassembled body having a large aggregation strength of fine powders can be formed.

In order to obtain a high aggregation strength, it is advantageous for the fine powder particles to have a higher moisture content. However, when carrying out the reassembling step with fine powder particles at a high moisture content or when carrying out the reassembling step by mixing a fine powder and a polymer having a particle diameter of less than 300 μm, an excessively large lump of the reassembled body may occur and it may cause a problem in the reassembling step. However, when carrying out the reassembling step by mixing a fine powder having a particle diameter of 180 μm or less and a polymer having a large particle diameter of 300 μm or more and adding steam thereto, as in the preparation method of the present invention, even if reassembled with a high water content, its handling is easy and an assembly having a large aggregation strength can be formed. This is because a polymer having a large particle diameter of 300 μm or more acts to prevent a phenomenon where a size of a lump of the fine powder-reassembled body becomes excessively large during the reassembling step of fine powders, to prevent a trouble in the operation load and equipment during the reassembling step, and to form a reassembled body with an uniform size.

In addition, when carrying out the reassembling step by mixing only the fine powder and the polymer without adding steam, or when carrying out the reassembling step by adding only water and not steam, the fine powders do not uniform absorb moisture and thus a reassembled body having partially low aggregation strength is formed. This is not preferred because it may be crushed again into fine powders after the reassembling step.

The particle diameter of the polymer to be mixed with the fine powder may be about 300 μm or more, for example about 300 μm to about 600 μm. When mixing by using a polymer having a particle diameter of less than 300 μm, it cannot prevent a phenomenon where a size of the reassembled body of the fine powder becomes excessively large as described above.

Steam can be sprayed only in the reassembling step after a polymer having a particle diameter of 300 μm or more and a fine powder are mixed. Alternatively, steam can be sprayed during the mixing step, or during both mixing step and reassembling step. However, it is not particularly limited.

According to one embodiment of the present invention, the reassembling step can be carried out by further mixing with water in addition to steam. When carrying out the reassembling step by further mixing with water, the total addition amount of steam and water may be about 30 to about 300 parts by weight, preferably about 40 to about 250 parts by weight, based on 100 parts by weight of the entire mixture to which a fine powder having a particle diameter of 180 μm or less and a polymer having a large particle diameter of 300 μm or more are added.

According to one embodiment of the present invention, the reassembling step may be carried out by mixing a fine powder having a particle diameter of 180 μm or less in an amount of about 50% to about 98% by weight and a polymer having a large particle diameter of 300 μm or more in an amount of about 2% to about 50% by weight. Preferably, the reassembling step may be carried out by mixing a fine powder having a particle diameter of 180 μm or less in an amount of about 60% to about 95% by weight and a polymer having a large particle diameter of 300 μm or more in an amount of about 5% to about 40% by weight. When the polymer having a large particle diameter of 300 μm or more is mixed in an appropriate ratio, in about 2% to 50% by weight, it is possible to exhibit the effect of improving the aggregation strength due to the mixing.

According to one embodiment of the present invention, a step of drying a reassembled polymer is further carried out.

At this time, the drying temperature may be about 150° C. to about 250° C. When the drying temperature is less than 150° C., it is likely that the drying time becomes excessively longer or the physical properties of the super absorbent polymer formed finally are deteriorated, and when the drying temperature is higher than 250° C., only the surface of the polymer is excessively dried, and thus it is likely that a fine powder is generated during a subsequent pulverizing process and the physical properties of the super absorbent polymer formed finally are deteriorated. Therefore, the drying step may be carried out preferably at a temperature of about 150° C. to about 200° C., and more preferably at a temperature of about 160° C. to about 180° C.

Meanwhile, the drying time may be about 20 to about 90 minutes in consideration of the process efficiency, but it is not limited thereto.

After carrying out the drying step, the moisture content of the polymer may be about 0.1% to about 10% by weight.

According to one embodiment of the present invention, after drying the reassembled body, the steps of pulverizing and classifying it may be further carried out so that the particle diameter is about 180 μm to 850 μm.

According to one embodiment of the present invention, the method may further include a step of surface-crosslinking the pulverized or classified polymer.

The surface crosslinking is a step of increasing the crosslinking density near the surface of the super absorbent polymer particle related to the crosslinking density inside the particles. In general, the surface crosslinking agent is applied to the surface of the super absorbent polymer particle. Therefore, this reaction occurs on the surface of the super absorbent polymer particle, which improves crosslinking properties on the surface of the particle without substantially affecting the inside of the particle. Thus, the surface-crosslinked super absorbent polymer particles have a higher level of crosslinking near the surface than in the inside.

In this case, the surface crosslinking agent is not particularly limited as long as it is a compound capable of reacting with functional groups of the polymer.

Preferably, in order to improve the properties of the produced super absorbent polymer, one or more selected from the group consisting of a polyhydric alcohol compound; an epoxy compound; a polyamine compound; a haloepoxy compound; a condensation product of the haloepoxy compound; an oxazoline compound; a mono-, di- or polyoxazolidinone compound; a cyclic urea compound; a polyvalent metal salt; and an alkylene carbonate compound may be used as the surface crosslinking agent.

Specific examples of the polyhydric alcohol compound may include one or more selected from the group consisting of a mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may include ethylene glycol diglycidyl ether, glycidol and the like. The polyamine compound may include one or more selected from the group consisting of ethylene diamine, diethylene triamine, triethylene tetraamine, tetraethylene pentamine, pentaethylene hexamine, polyethylene imine, and polyamide polyamine.

Further, the haloepoxy compound may include epichlorohydrin, epibromohydrin, or α-methylephichlorohydrin. Meanwhile, the mono-, di-, or polyoxazolidinone compound may include, for example, 2-oxazolidinone and the like.

Further, the alkylene carbonate compound may include ethylene carbonate and the like. These may be used alone or in combination with each other. On the other hand, to increase the efficiency of the surface crosslinking process, these surface crosslinking agents may include one or more polyhydric alcohols having 2 to 10 carbon atoms.

The amount of the surface crosslinking agent added may be suitably selected depending on the kind of the surface crosslinking agent added or the reaction conditions. However, the surface crosslinking agent may be typically used in an amount of about 0.001 to about 5 parts by weight, preferably about 0.01 to about 3 parts by weight, and more preferably about 0.05 to about 2 parts by weight, based on 100 parts by weight of the polymer.

When the amount of the surface crosslinking agent used is excessively small, the surface crosslinking reaction hardly occurs, and when the amount is higher than 5 parts by weight based on 100 parts by weight of the polymer, the absorptivity and the physical properties may be decreased due to excessive surface crosslinking reaction.

The crosslinking reaction and the drying process may be carried out simultaneously by heating the polymer particles to which the surface crosslinking agent is added.

The temperature elevating means for the surface crosslinking reaction is not particularly limited and may include applying a heat transfer medium or directly applying a heat source. In this case, examples of the heat transfer medium used herein may include, but are not limited to, any heated fluid, such as steam, hot air, or hot oil. And, the temperature of the heat transfer medium may be property regulated in consideration of the means for the heat transfer medium, the heating rate, and the desired heating temperature. Examples of the heat source directly provided may include, but are not limited to, electricity or gas.

As described above, in accordance with the preparation method of the present invention, the reassembled body obtained after the steps of reassembling, drying, pulverizing, classifying and surface-crosslinking the fine powders is used alone or it can be applied to a product by mixing a polymer having a normal particle size of 180 to 850 μm.

Further, when drying and pulverizing steps have been undergone for the reassembled polymer, it has been dried and pulverized, a portion of being re-crushed again in a fine powder is low, thereby having a high aggregation strength.

In the reassembled polymer obtained in accordance with the preparation method of the present invention, a weight ratio of particles of 180 μm or below may be less than about 10%, preferably less than about 5% and more preferably less than about 3%, based on the entire weight of a reassembled polymer after the pulverization.

Further, the reassembled polymer obtained in accordance with the preparation method of the present invention may have an aggregation strength calculated according to the following Equation 2 of more than about 20, or more than about 30, or more than about 40, for example, about 20 to about 200, or about 30 to about 150, or about 30 to about 100.

Aggregation strength=(1/weight ratio of particles of 180 μm or below after ball milling)*100 [Equation 2]

(in the above Equation 2, the ball milling is carried out by adding the polymer to a ball mill tester having ten 15 mm glass beads and pulverizing it at 150 rpm for 30 minutes).

The present invention will be described in more detail with reference to the following Examples. However, the following Examples are for illustrative purposes only, and the present invention is not intended to be limited by these Examples.

EXAMPLES

Example 1

Based on 100 parts by weight of acrylic acid monomer, 38.9 parts by weight of sodium hydroxide(NaOH) and 103.9 parts by weight of water were mixed. To the mixture, 0.1 part by weight of sodium persulfate as a thermal polymerization initiator, 0.01 part by weight of diphenyl(2,4,6-trimethylbenzoyl)phosphine oxide as a photopolymerization initiator, and 0.3 part by weight of polyethylene glycol diacrylate as a crosslinking agent were added to prepare a monomer composition.

The internal temperature was maintained at 80° C. and the monomer composition was irradiated with ultraviolet rays for 1 minute while flowing at a flow rate of 243 kg/hr on a continuous belt polymerization reactor in which an ultraviolet irradiation device having an intensity of 10 mW with a mercury UV lamp light source is equipped on the upper portion, and further polymerization reaction was carried out in non-light source state for two minutes.

After completion of the polymerization, the gel type polymer sheet was primarily cut by using a shredder type cutter and then chopped up in a crumb form through a meat chopper. Subsequently, it was dried through a hot air drier at a temperature of 180° C. for 30 minutes, then re-pulverized by using a rotary mixer and classified into 180 μm to 850 μm using a particle size distribution measuring instrument to prepare a super absorbent polymer.

Among the prepared super absorbent polymer, 95 kg/hr of a fine powder having a particle diameter of 180 μm or less and 5 kg/hr of a polymer having a particle diameter of 300 μm or more were mixed. While mixing in a fine powder-assembling apparatus and spraying 100 kg/hr of steam under pressure of 0.5 MPa at about 152° C., the reassembling was carried out to obtain a reassembled body.

The reassembled body was dried at 180° C. for 30 minutes to prepare a super absorbent polymer having a moisture content of below 3%. The super absorbent polymer was pulverized and classified, and then 0.1 wt % of ethylene glycol diglycidyl epoxide was added thereto and uniformly mixed. Then, the surface treatment reaction was carried out at 140° C. for 1 hour.

Example 2

The super absorbent polymer was obtained substantially according to the same method as in Example 1, except that 90 kg/hr of a fine powder having a particle diameter of 180 μm or less and 10 kg/hr of a polymer having a particle diameter of 300 μm or more were mixed.

Example 3

The super absorbent polymer was obtained substantially according to the same method as in Example 1, except that 80 kg/hr of a fine powder having a particle diameter of 180 μm or less and 20 kg/hr of a polymer having a particle diameter of 300 μm or more were mixed.

Example 4

The super absorbent polymer was obtained substantially according to the same method as in Example 1, except that 50 kg/hr of a fine powder having a particle diameter of 180 μm or less and 50 kg/hr of a polymer having a particle diameter of 300 μm or more were mixed.

Example 5

The super absorbent polymer was obtained substantially according to the same method as in Example 1, except that 40 kg/hr of steam was mixed instead of 100 kg/hr of steam.

Example 6

The super absorbent polymer was obtained substantially according to the same method as in Example 1, except that 250 kg/hr of steam was mixed instead of 100 kg/hr of steam.

Example 7

The super absorbent polymer was obtained substantially according to the same method as in Example 1, except that 100 kg/hr of steam and 40 kg/hr of water were added together and mixed.

Comparative Example 1

The super absorbent polymer was obtained substantially according to the same method as in Example 1, except that only 100 kg/hr of a fine powder having a particle diameter of 180 μm or less was added and a polymer having a particle diameter of 300 μm or more was not mixed.

Comparative Example 2

The super absorbent polymer was obtained substantially according to the same method as in Example 1, except that 100 kg/hr of water was mixed instead of steam.

Comparative Example 3

The super absorbent polymer was obtained substantially according to the same method as in Example 1, except that only 100 kg/hr of a fine powder having a particle diameter of 180 μm or less was added, a polymer having a particle diameter of 300 μm or more was not mixed, and 100 kg/hr of water was mixed instead of steam.

Comparative Example 4

The super absorbent polymer was obtained substantially according to the same method as in Example 1, except that 90 kg/hr of a fine powder having a particle diameter of 180 μm or less and 10 kg/hr of a polymer having a particle diameter of 180 μm or more and less than 300 μm were mixed.

Experimental Example

Among the super absorbent polymer prepared in Examples 1 to 7 and Comparative Examples 1 to 4, only a particle having a particle diameter of 300 to 600 μm was sorted to measure the permeability and the aggregation strength.

Method of Measuring Permeability

The penetrability was measured by using 0.9% salt water solution under the load of 0.3 psi according to the method disclosed in the literature (Buchholz, F. L. and Graham, A. T., "Modern Superabsorbent Polymer Technology," John Wiley & Sons(1998), page 161).

More specific measurement method is described as follows. From the super absorbent polymer (hereinafter, referred to as "sample") prepared in Examples 1 to 7 and Comparative Examples 1 to 4, 0.2 g of a particle having a particle size of 300 to 600 μm was taken and added to a prepared cylinder, to which 50 g of 0.9% saline solution was added and left for 30 minutes. Then, the weight of 0.3 psi was put on the super absorbent polymer to which 0.9% saline solution was absorbed, and left for one minute. Then, the time that 0.9% saline solution passed from the upper limit line to the lower limit line marked beforehand on the cylinder was measured after opening the stopcock at the bottom of the cylinder. Every measurement was carried out at the temperature of 24±1° C. and the relative humidity of 50±10%.

The passage time from the upper limit line to the lower limit line was measured for every sample and the passage time without the super absorbent polymer (SAP) was measured. Thus, the permeability was calculated according to the following Equation 1:

Permeability (sec)=Time (sample)−Time (without SAP)  [Equation 1]

Method of Measuring Aggregation Strength 10 g of the super absorbent polymers prepared in Examples 1 to 7 and Comparative Examples 1 to 4 were added to a ball mill tester having ten 15 mm glass beads and pulverized at 150 rpm for 30 minutes. Then, the weight ratio of the particles of 180 μm or below based on the total weight was measured.

With respect to the measured weight ratio, the aggregation strength was calculated according to the following Equation 2:

Aggregation strength=(1/weight ratio of particles of 180 μm or below after ball milling)*100  [Equation 2]

In accordance with the above-described method, the permeability, the weight ratio of particles of 180 μm or below after ball milling and the aggregation strength of Examples 1 to 7 and Comparative Examples 1 to 4 were measured and the results are shown in Table 1 below.

TABLE 1

|  | Permeability (unit: sec) | Weight ratio of particles of 180 μm or below after ball milling (unit: %) | Aggregation strength |
|---|---|---|---|
| Example 1 | 12 | 2.02 | 50 |
| Example 2 | 8 | 1.84 | 54 |
| Example 3 | 20 | 2.23 | 45 |
| Example 4 | 45 | 3.83 | 26 |
| Example 5 | 25 | 2.84 | 35 |
| Example 6 | 15 | 2.14 | 47 |
| Example 7 | 11 | 1.91 | 56 |
| Comparative Example 1 | 68 | 2.99 | 33 |
| Comparative Example 2 | 15 | 4.76 | 21 |
| Comparative Example 3 | 180 | 10.00 | 10 |
| Comparative Example 4 | 66 | 3.16 | 34 |

Referring to Table 1 above, it could be seen that Examples 1 to 7 according to the present invention had a significantly lower fine powder ratio of the reassembled body and a higher aggregation strength as compared with Comparative Examples 1 to 4.

What is claimed is:

1. A method for preparing a super absorbent polymer, comprising the steps of:
   carrying out a thermal polymerization or a photopolymerization of a monomer composition including a water-soluble ethylene-based unsaturated monomer and a polymerization initiator to form a hydrogel polymer;
   drying the hydrogel polymer;
   pulverizing a dried polymer;
   mixing a fine powder having a particle diameter of 180 μm or less and a polymer having a particle diameter of 300 μm or more among a pulverized polymer;
   and adding steam to a mixture to carry out a reassembling.

2. The method according to claim 1, wherein a temperature of the steam is 100° C. to 200° C.

3. The method according to claim 1, wherein the reassembling step is carried out by adding the steam in an amount of 30 to 300 parts by weight, based on 100 parts by weight of the entire mixture to which the fine powder having the particle diameter of 180 μm or less and the polymer having the particle diameter of 300 μm or more are added.

4. The method according to claim 1, wherein the reassembling step is carried out by mixing the fine powder having the particle diameter of 180 μm or less in an amount of 50 to 98% by weight and the polymer having the particle diameter of 300 μm or more in an amount of 2 to 50% by weight.

5. The method according to claim 1, wherein the reassembling step is carried out by further mixing water.

6. The method according to claim 1, wherein after the reassembling step, the method further comprises a step of drying a reassembled polymer.

7. The method according to claim 6, wherein after the step of drying the reassembled polymer, the method further comprises a step of pulverizing or classifying a dried reassembled polymer.

8. The method according to claim 7, further comprising a step of surface-crosslinking the pulverized or classified reassembled polymer.

9. The method according to claim 7, wherein a weight ratio of particles of 180 μm or below is less than about 10%, based on the entire weight of the reassembled polymer after the pulverization.

* * * * *